(12) United States Patent
Schmitz (10) Patent No.: US 10,528,598 B2
(45) Date of Patent: Jan. 7, 2020

(54) ENERGY MANAGEMENT SYSTEM AND METHOD

(71) Applicant: SCHNEIDER ELECTRIC USA, INC., Andover, MA (US)

(72) Inventor: Michael Edward Denis Schmitz, Victoria (CA)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 458 days.

(21) Appl. No.: 15/052,283

(22) Filed: Feb. 24, 2016

(65) Prior Publication Data

US 2016/0253406 A1    Sep. 1, 2016

Related U.S. Application Data

(60) Provisional application No. 62/121,404, filed on Feb. 26, 2015.

(51) Int. Cl.
| | |
|---|---|
| *G06F 7/00* | (2006.01) |
| *G06F 16/28* | (2019.01) |
| *G06F 16/26* | (2019.01) |
| *G06F 16/248* | (2019.01) |
| *G06Q 10/06* | (2012.01) |
| *G06Q 50/06* | (2012.01) |

(52) U.S. Cl.
CPC .......... *G06F 16/285* (2019.01); *G06F 16/248* (2019.01); *G06F 16/26* (2019.01); *G06Q 10/06* (2013.01); *G06Q 50/06* (2013.01); *Y02P 90/82* (2015.11)

(58) Field of Classification Search
CPC ........ G05B 15/02; G06Q 10/06; G06Q 50/06; H02J 13/00; H02J 13/0079; H04W 4/008; G06F 16/972; G06F 16/285; G06F 16/20; G06F 16/10; G06F 16/951; G06F 16/957
See application file for complete search history.

(56) References Cited

U.S. PATENT DOCUMENTS

| | | | | |
|---|---|---|---|---|
| 5,193,917 | A * | 3/1993 | Adler | F16C 25/083 384/517 |
| 5,493,941 | A * | 2/1996 | Verge | G10G 5/005 403/54 |
| 7,647,385 | B2 * | 1/2010 | Encarnacion | H04L 63/10 709/217 |
| 9,792,160 | B2 * | 10/2017 | Shear | G06F 9/5072 |

(Continued)

FOREIGN PATENT DOCUMENTS

WO    2014124490 A1    8/2014

OTHER PUBLICATIONS

Anonymous: "Remote control—Wikipedia, the free encyclopedia", Feb. 22, 2015 (Feb. 22, 2015), XP055264960, Retrieved from the Internet: URL:https://en.wikipedia.org/w/index.php?title=Remote_control&oldid=648361721 [retrieved on Apr. 13, 2016] * the whole document *.

(Continued)

*Primary Examiner* — Daniel A Kuddus
(74) *Attorney, Agent, or Firm* — Lando & Anastasi, LLP (57) ABSTRACT

Systems and methods are provided for remotely managing tangible resources. In one embodiment, a method may employ a computer-based system to receive resource information, categorize the resource information, and provide the categorized resource information within a matrix.

19 Claims, 5 Drawing Sheets

(56) References Cited

U.S. PATENT DOCUMENTS

| | | | |
|---|---|---|---|
| 9,904,579 B2* | 2/2018 | Shear | G06F 16/245 |
| 2005/0138193 A1* | 6/2005 | Encarnacion | H04L 12/2803 |
| | | | 709/230 |
| 2009/0313282 A1* | 12/2009 | Bhagwan | G06F 11/3442 |
| 2012/0173927 A1* | 7/2012 | Rymeski | G06F 11/0709 |
| | | | 714/26 |
| 2012/0232969 A1* | 9/2012 | Fadell | G06Q 10/20 |
| | | | 705/14.4 |
| 2014/0192580 A1* | 7/2014 | Mohammad | G11C 15/04 |
| | | | 365/49.17 |
| 2014/0277769 A1* | 9/2014 | Matsuoka | F24F 11/30 |
| | | | 700/278 |
| 2014/0282172 A1* | 9/2014 | Bull | G06Q 10/06 |
| | | | 715/771 |
| 2014/0282586 A1* | 9/2014 | Shear | G06F 9/5072 |
| | | | 718/104 |
| 2016/0266939 A1* | 9/2016 | Shear | G06F 9/5072 |

OTHER PUBLICATIONS

Extended European Search Report from corresponding European Application No. 16157453.8 dated Apr. 28, 2016.

\* cited by examiner

ENERGY MANAGEMENT SYSTEM AND METHOD

The present application claims priority from U.S. provisional patent application No. 62/121,404, filed Feb. 26, 2015, entitled SYSTEM AND METHOD FOR DATA ORGANIZATION, which is incorporated herein by reference in its entirety.

BACKGROUND

Technical Field

Aspects and examples described herein relate to systems and methods for organizing data and more particularly to receiving data elements and creating a tree displaying the data.

SUMMARY

Currently, systems display energy management information in a tree structure by displaying a node for each element, monitored device, and location. Non-technical users may not be able to easily read these trees because nodes are hard to distinguish from one another once a tree becomes larger.

Other current systems separate locations and data elements into separate representations. These systems allow users to independently pick a location or a data element and may show information relating to each location and data element individually. Further, other current systems organize all of the information by data element. These tag-based approaches are usually associated to a specific location, and are not useful when data is received from multiple different locations.

There exists a need to provide data elements in a format that can easily be associated to a location, a monitored device, and a tangible resource (e.g., electricity, water, steam, gas, air, and others). There is a need for bulk configurability of data elements taken from multiple locations. Instead of displaying every data element and location in a long, unformatted list, the embodiments disclosed herein include methods and systems to organize, sort, filter, and view data elements according to associated locations.

According to one embodiment, a resource management system is provided, comprising a memory, at least one processor coupled to the memory, and a matrix visualization component executable by the at least one processor and configured to receive a set of data elements descriptive of a plurality of tangible resources disposed within a plurality of locations, categorize the set of data elements by tangible resource and location to produce a categorized set of data elements, provide the categorized set of data elements within a matrix having a first dimension and a second dimension, the first dimension representing the plurality of tangible resources, the second dimension representing the plurality of locations.

In an example of the resource management system, at least one of the plurality of tangible resources is electricity, water, gas, or weather. In one example the set of data elements includes one or more of power demand, energy, apparent power demand, apparent energy, reactive power demand and reactive energy. In another example, the set of data elements includes one or more of gas volume, gas energy and gas rate of change. In another example, the set of data elements includes one or more of temperature, heating, cooling, relative humidity, indoor temperature, dew point, temperature wind chill, temperature wet bulb, minutes of sunshine and solar radiance.

In an example, the matrix visualization component is further configured to generate and display a graph of a selected set of data elements from the categorized set of data elements. In one example, the selected set of data elements includes data elements derived from two or more different locations. In one example, the selected set of data elements includes two or more different types of data elements. In one example, the set of data elements includes one or more of production output and key performance indicators. In an example, units of each data element in the set of data elements are determined by a user's location.

According to one embodiment, a method of managing resources is provided, the method comprising receiving a set of data elements descriptive of a plurality of tangible resources disposed within a plurality of locations, categorizing the set of data elements by tangible resource and location to produce a categorized set of data elements, and providing the categorized set of data elements within a matrix having a first dimension and a second dimension, the first dimension representing the plurality of tangible resources, the second dimension representing the plurality of locations.

In an example, at least one of the plurality of tangible resources is electricity, water, gas or weather. The set of data elements includes one or more of power demand, energy, apparent power demand, apparent energy, reactive power demand and reactive energy. In one example, the set of data elements includes one or more of gas volume, gas energy and gas rate of change. In another example, the set of data elements includes one or more of temperature, heating, cooling, relative humidity, indoor temperature, dew point, temperature wind chill, temperature wet bulb, minutes of sunshine and solar radiance.

In an example, the matrix visualization component is further configured to generate and display a graph of a selected set of data elements from the categorized set of data elements. In one example, the selected set of data elements includes data elements derived from two or more different locations. In one example, the selected set of data elements includes two or more different types of data elements. In one example, the set of data elements includes one or more of production output and key performance indicators. In one example, the units of each data element in the set of data elements are determined by a user's location.

Aspects and examples disclosed herein relate to displaying a homogenous matrix of physical locations and monitored devices with associated data elements related to the physical and software resources. For instance, a specialized computer system may be used to poll data descriptive of tangible resources and organize the data in a way that is easily displayed and read.

Still other aspects, examples, and advantages of these exemplary aspects and examples, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of any particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Aspects and examples disclosed herein relate to apparatus and processes for creating a hierarchical matrix for locations, monitored devices, and data elements using a variety of innovative techniques. For instance, processes and apparatus in accord with some examples provide for a data matrix visualization system that provides an interface through which the data matrix visualization system receives data elements descriptive of several tangible resources. The data matrix visualization system may also provide a user interface through which the data matrix visualization system receives preferential information from external entities, such as users or computer systems. In several of these examples, the data matrix visualization system is created using secure processes and includes specialized components that enable the data matrix visualization system to generate unique authentication credentials. The data matrix visualization system may generate user profiles and associate the user profiles with sets of data preferences. The data preferences may be used to generate a hierarchical matrix descriptive of tangible resources.

According to some examples, the data matrix visualization system receives data descriptive of tangible resources. Examples of tangible resources include water, air, gas, electricity, steam, and others (e.g., costs, humidity, temperature, illuminance, emissions, etc.). In some examples, monitored devices monitor, control, provide, or consume tangible resources. Examples of monitored devices include servers, heaters, air conditioners, computers, printers, meters, and other equipment. Some monitored devices may generate multiple data elements. Monitored devices may be disposed at various locations. A location may be any defined space. Examples of locations include continents, countries, cities, sites, buildings, rooms, ceilings, walls, floors, systems, enclosures, and monitored devices. Additionally, locations may be included within other locations. The data matrix visualization system may display a hierarchical matrix including a tree of locations that illustrates how monitored devices are related to each other. In some embodiments, the data matrix visualization system may be implemented and used within an energy management system that is connected to supervisory control and data acquisition (SCADA) systems, building management systems (BMS), building automation systems (BAS), heating, ventilating, and air conditioning (HVAC) systems, and other systems that record information.

According to one example, data received from the monitored devices may be related to water, air, gas, electricity, steam, and other utilities. The received data may include consumption information, cost information, temperature information, humidity information, and other information related to a location or a monitored device. The data may be received in different units depending on the type of data. In one embodiment, each monitored device may send an indication of the type of data being sent to the data matrix visualization system.

As discussed below with respect to FIG. 1, the data matrix visualization system may present a hierarchical tree descriptive of tangible resources at various locations. Each tangible resource may have associated icons for data relating to the tangible resource. The icons may symbolize water, air, gas, energy, steam, and others. The data matrix visualization system may receive information identifying filters for the data displayed. In some examples, the data matrix visualization system is configured to receive input selecting an icon via an interface and, responsive to receiving the input, provide more detailed information (e.g., time charts, values, units, comparisons, etc.) to an external entity via the interface.

In various examples, the data matrix visualization system may create user profiles specifying which data should be displayed in association with each icon. For instance, the data matrix visualization system may associate the electricity icon with real demand for electricity for one user profile and may associate the same electricity icon with reactive power in volt-amperes (VAR) with another user profile. The data matrix visualization system may associate any number of data elements with each icon based on user preferences.

In one example, the data presented is refreshed according to a predetermined schedule. In other examples, the data matrix visualization system may receive input requesting that the data be refreshed. When the data matrix visualization system refreshes data, it may poll data from any or all of the monitored devices. In another embodiment, the data matrix visualization system may refresh data values displayed based on the most recent data received from each monitored device.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Data Matrix Visualization System

Various examples disclosed herein effect a data matrix visualization system that builds and presents a hierarchical matrix of locations and data elements for the corresponding tangible resources on one or more computer systems. As is explained further below, examples of the data matrix visualization system aggregate data from multiple monitored devices and provide clustered data via a matrix that saves space, is user-friendly, and provides bulk configurability of data.

Figure 1:
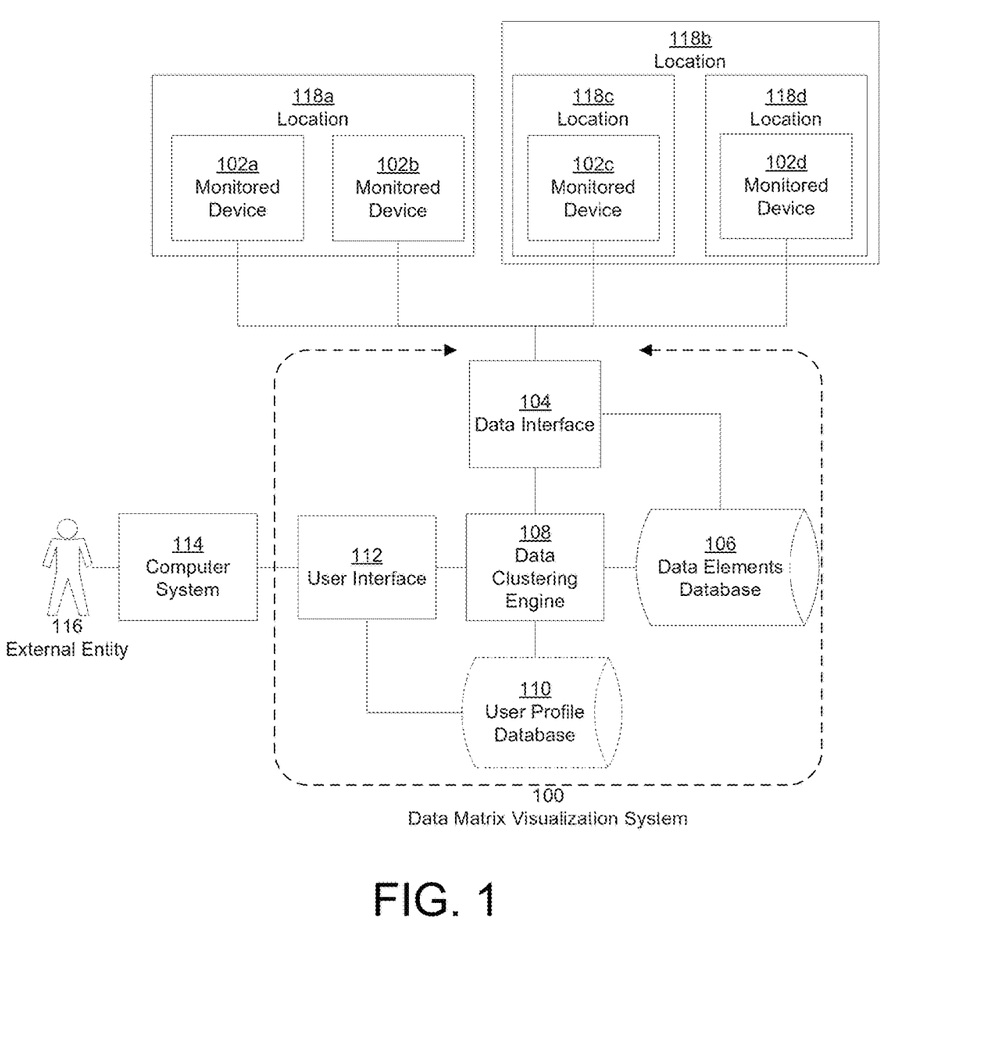
FIG. 1 is an example block diagram of a data matrix visualization system according to one embodiment.

FIG. 1 includes a data matrix visualization system 100 coupled to monitored devices 102a, 102b, 102c, and 102d, and a computer system 114. The monitored devices 102a and 102b are disposed within a location 118a. The monitored devices 102c and 102d are respectively disposed within locations 118c and 118d. The locations 118c and 118d are disposed within the location 118b. According to various examples, the data matrix visualization system 100 is implemented using one or more computer systems, such as the distributed computer system 700 discussed below with regard to FIG. 7. Thus, examples of the data matrix visualization system 100 include a variety of hardware and software components configured to perform the functions described herein and examples are not limited to a particular hardware component, software component or particular combination thereof.

Information may flow between the elements, components and subsystems described herein using a variety of techniques. Such techniques include, for example, passing the information over the network using standard protocols, such as TCP/IP, passing the information between modules in memory and passing the information by writing to a file, database, or some other non-volatile storage device. In addition, pointers or other references to information may be transmitted and received in place of, or in addition to, copies of the information. Conversely, the information may be exchanged in place of, or in addition to, pointers or other references to the information. Other techniques and protocols for communicating information may be used without departing from the scope of the examples disclosed herein.

In the illustrated example, the data matrix visualization system 100 includes a data interface 104, a data elements database 106, a data clustering engine 108, an optional user profile database 110, and a user interface 112. As discussed below, the data elements database 106 includes a variety of information regarding monitored devices 102a, 102b, 102c, and 102d and locations 118a, 118b, 118c, and 118d received over a period of time. The data interface 104 may receive data from monitored devices 102a, 102b, 102c, and 102d and locations 118a, 118b, 118c, and 118d descriptive of status information, cost information, and tangible resource information (e.g., information relating to movement, production, demand, or consumption of water, air, gas, electricity, steam, and others). The data clustering engine 108 may receive information from the data interface 104 and store the information in the data elements database 106. In other embodiments, the data interface 104 directly stores data into the data elements database 106. Further, the data clustering engine 108 may sort the data into categories based on the content of the data and the originating location of the data. For example, the data clustering engine 108 may sort energy data into an electricity category and water pressure data into a water category.

In some embodiments, the data clustering engine 108 may process data elements from the data interface 104 based on the units of the data and convert the data elements into different units according to user preferences stored in the optional user profile database 110. If a user has specific settings for elements, those settings are stored in the user profile database 110. The user profile database 110 may also include user profile information relating to what information a user has access to view, what data elements a user wants to filter out, and which locations a user wants to track.

In some embodiments, wherein users do not have user profiles, the data clustering engine 108 may only view text filters and selection filters to update data elements that are displayed. If no filters are used, the data clustering engine 108 may display all of the data elements from the data elements database 106.

The data elements database 106 depicted in FIG. 1 includes components that store and retrieve measurement data elements. In general, measurement data elements may include any information received by the data interface 104 from monitored devices 102a, 102b, 102c, and 102d and locations 118a, 118b, 118c, and 118d. The information stored in the data elements database 106 may be associated with readings relating to water, air, gas, electricity, steam, and others in various monitored devices 102a, 102b, 102c, and 102d and locations 118a, 118b, 118c, and 118d. The monitored devices 102a, 102b, 102c, and 102d may include any physical component with sensors, meters, software systems, or other data logging devices that can read and transmit different types of data elements. The data elements database 106 may also include the type (e.g., units) and timestamps indicating the time period the data was generated or received. Further, the data elements database 106 may include associations between data elements, locations 118a, 118b, 118c, and 118d, and monitored devices 102a, 102b, 102c, and 102d. According to one embodiment, the data elements database includes a tree consisting of monitored devices 102a, 102b, 102c, and 102d and locations 118a, 118b, 118c, and 118d and associated data elements. According to other embodiments, the data elements database 106 includes pointers to associate data elements to monitored devices 102a, 102b, 102c, and 102d and locations 118a, 118b, 118c, and 118d. Monitored devices 102a, 102b, 102c, and 102d and locations 118a, 118b, 118c, and 118d may further have parent monitored devices and/or locations, the parent monitored devices and locations each having data elements associated with them. For example, location 118c has a parent location 118b that encompasses location 118c.

The data clustering engine 108 may receive data elements from the data elements database 106, organize the data elements into categories (e.g., based on location and associated tangible resources), filter the data elements based on user preferences or user inputs, and provide the data elements to a computer system 114 and an external entity 116 via a user interface 112. The data clustering engine 108 may also update icons in the user interface based on user preferences and filters.

Example Process Flow Diagram

Figure 2:
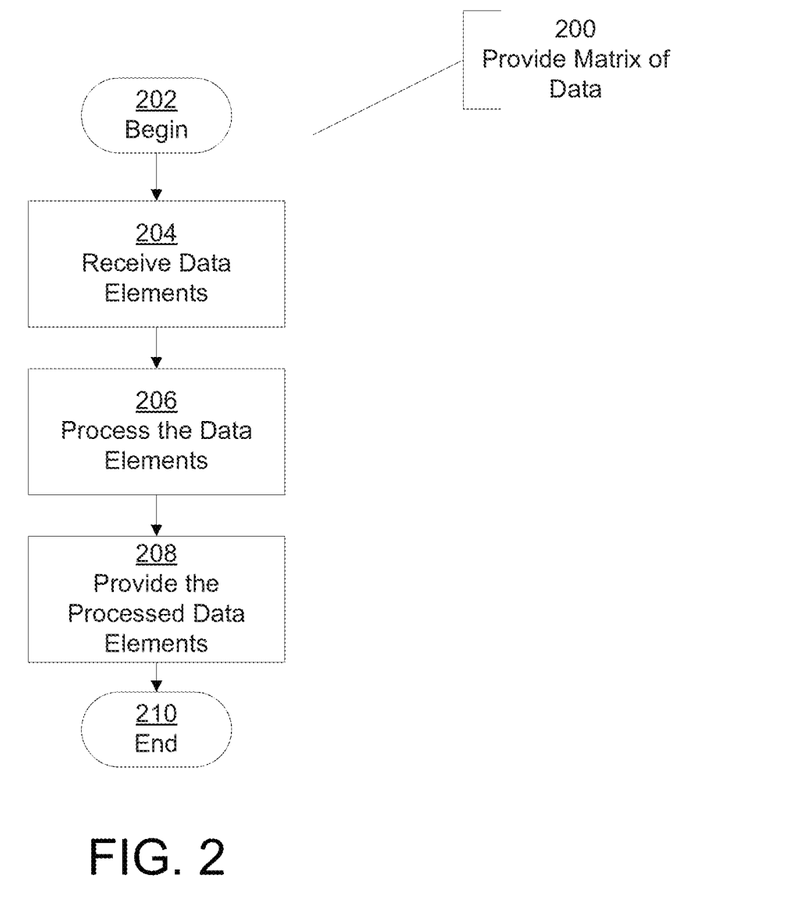
FIG. 2 is an example process flow diagram of a method for providing a matrix of locations and associated data elements according to one embodiment.

FIG. 2 illustrates an example process flow diagram of a process 200 for providing a hierarchical matrix of locations and data elements categorized by data elements representative of tangible resources according to one embodiment. Process 200 includes receiving data elements at block 204, processing the data elements at block 206, and providing the processed data elements at block 208. Process 200 begins at block 202.

At block 204, the data matrix visualization system may receive data from various monitored devices in various locations. The data elements may be received via a plurality of different communication techniques, as known to one skilled in the art. Each data element may include a type identifier to identify the data category and type (e.g., energy demand in kilovolt-amperes). Each monitored device may also include a parent monitored device in the data elements being sent. Each data element may be associated with a location (e.g., a city, monitored device, computer, etc.). Once the data matrix visualization system receives data elements from all of the monitored devices, at block 206, the data matrix visualization system may process the data elements. Processing the data elements may include sorting the data elements into categories representative of tangible resources (e.g., water, air, gas, electricity, steam, and others) and formatting the data elements according to user preferences. The data matrix visualization system may also check filters to see if any data elements should not be displayed in the hierarchical tree matrix. Additionally, the data matrix visualization system may edit icons based on whether data elements requested by a user are available or not. At block 208, the data matrix visualization system may provide the data elements and associated locations in a matrix, as illustrated in FIG. 3.

Hierarchical Tree

Figure 3:
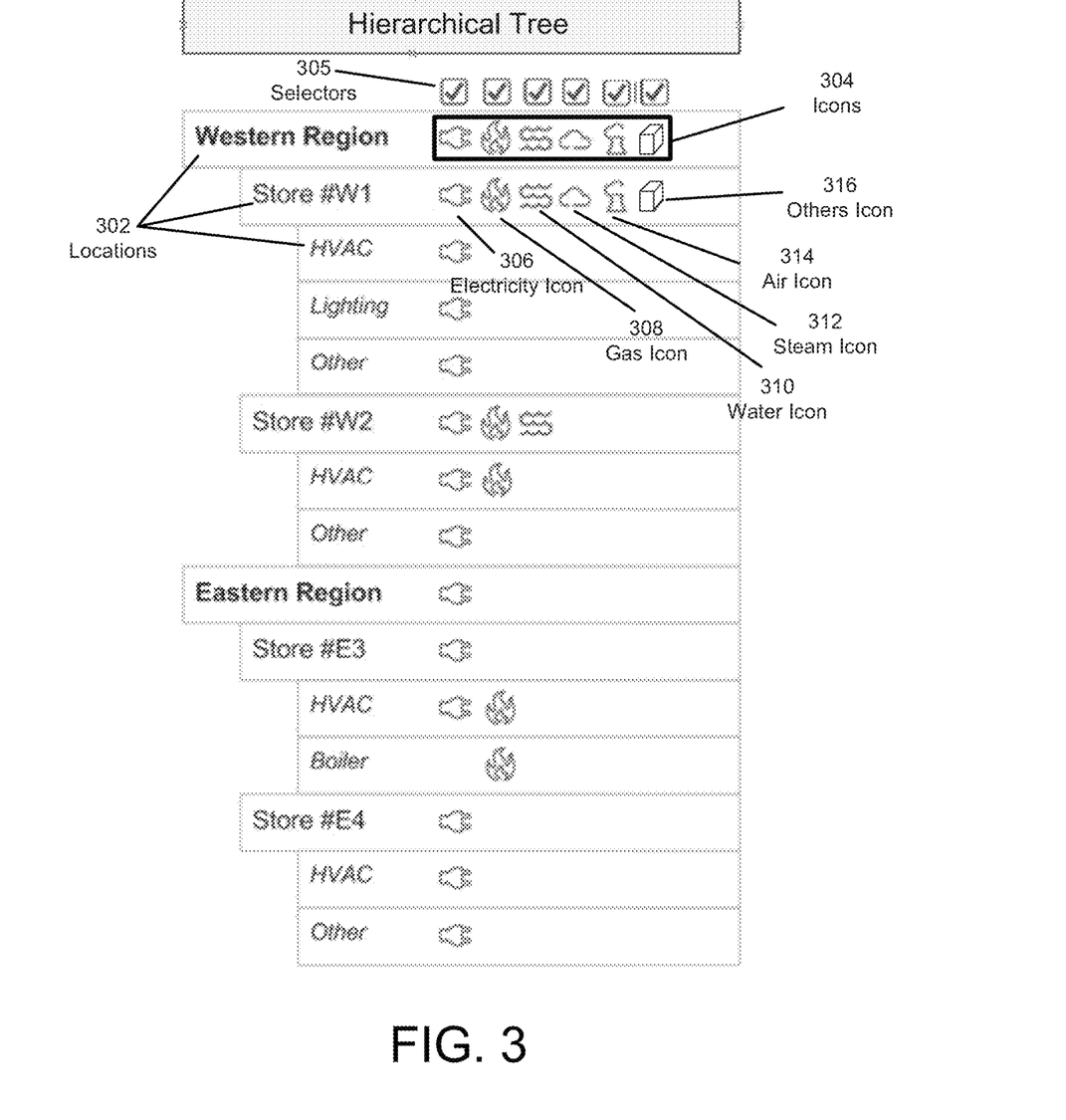
FIG. 3 is an example location and monitored device matrix, according to one embodiment.

One example hierarchical tree including locations 302, icons 304, and selectors 305 is illustrated in FIG. 3. As presented, the locations 302 may include places (e.g., Western Region and Store #W1) and monitored devices within each place. The locations 302 may be filtered to display only data elements related to a specific icon 304 associated with a particular tangible resource. In some embodiments, a location 302 may receive an input to display or hide sub-locations within the tree. For example, Store #W1 may receive an input to hide the sub-locations HVAC, Lighting, and Other. In this example, Store #W1 may be displayed directly above Store #W2. The data matrix visualization system may then create an indication (e.g., bolded letters) on Store #W1 to illustrate that sub-locations exist but are not currently being displayed. The icons 304 may include an electricity icon 306, a gas icon 308, a water icon 310, a steam icon 312, an air icon 314, and an others icon 316. Each icon may be related to and associated with a different tangible resource, as described further below.

According to some examples, the icons 304 may be displayed in different states to indicate different information. In the example illustrated, the icons 304 correspond to electricity, gas, water, air, steam, and others. In one embodiment, if an icon 304 is not available for a given location 302, that location 302 does not have any data elements associated with the category of the icon 304. If the data matrix visualization system has data elements relating to an icon 304, but the user only wants to see other data elements relating to the icon 304, that icon 304 may be grayed out with a slash through it to indicate that data elements exist, but not the requested data elements. For example, the data matrix visualization system may receive a request for energy demand in kilowatts (KW) for all available monitored devices. If the data matrix visualization system does not have the energy demand for a lighting system, but rather only has the energy consumption in kilowatt-hours (KWH) of the lighting system, the data matrix visualization system may present an electricity icon 306 in gray with a slash through it. If the user hovers a mouse over the electricity icon 306 or if the data matrix visualization system receives an input on the electricity icon 306, the data matrix visualization system may display that only the energy consumption information of the lighting system is available. If a selector 305 is not selected and data elements are available in a corresponding icon 304, the corresponding icon 304 may be displayed as gray to indicate that data elements exist but the selector 305 for the data elements is not selected. If data elements exist and have been selected, the corresponding icons 304 may be displayed in black or another color. In some embodiments, the icons 304 may be shaded in different colors to indicate that data elements are available.

Each icon 304 may represent different types of data elements. The electricity icon 306 may be associated with data elements relating to energy consumption (e.g., in kilowatt-hours, megawatt-hours, etc.), energy demand (e.g., in kilovolt-amperes, etc.), active power consumption, active power demand, apparent energy consumption (e.g., in kilovolt-ampere-hours, etc.), apparent energy demand (e.g., in kilovolt-amperes, etc.) reactive energy consumption (e.g., in kilovolt-amp-reactive hours, etc.), reactive power consumption, reactive power demand, power factors, and other data elements related to electricity. The gas icon 308 may be associated with data elements relating to gas volume (e.g., in cubic feet, cubic meters, etc.), gas energy (e.g., in British thermal units, gigajoules, etc.), gas rate of change (e.g., in kilowatts per ton, etc.), and other metrics related to gas. The water icon 308 may be associated with water volume (e.g., in gallons, cubic meters, etc.), water energy (e.g., in ton-hours, kilowatt-hours, British thermal units, etc.), water rate (e.g., in ton-hours, kilowatt-hours, etc.), water pressure (e.g., in pounds per square inch, etc.), and any other metric related to water. The steam icon 312 may be associated with steam pressure (e.g., in pounds per square inch, etc.), steam flow rate (e.g., in pounds per hour, etc.), steam energy (e.g., in pounds, pulse, etc.), and other data elements related to steam. The air icon 314 may be related to air volume (e.g., in cubic feet), air pressure (e.g., in pounds per square inch), and other data elements related to air. The others icon 316 may be associated with recycling information (e.g., in cubic yards, gallons, pounds, etc. relating to electronics, plastics, glass, cardboard, etc.), energy costs (e.g., in dollars, etc.), energy forecasted costs (e.g., in dollars, etc.), temperature (e.g., in Fahrenheit, Celsius, etc.), precipitation (millimeters per hour, etc.), humidity (e.g., in percentage, mass per unit volume, etc.), illuminance (e.g., in hour intervals), emissions (e.g., grams per kilometer for steam, natural gas, heating oil, diesel fuel, coal, electricity, etc.), and other data elements that may be received that do not relate to any other the other categories.

Additional icons are available in some embodiments. For example, a weather icon may be included in certain embodiments and may be associated with temperature (e.g., in Fahrenheit, Celsius, Kelvin, etc.), heating and/or cooling (e.g., in Fahrenheit, Celsius, Kelvin, etc.), relative humidity (e.g., as a percentage, etc.), dew point (e.g., in Fahrenheit, Celsius, Kelvin, etc.), temperature wind chill (e.g., in Fahrenheit, Celsius, Kelvin, etc.), temperature wet bulb (e.g., in Fahrenheit, Celsius, Kelvin, etc.), indoor temperature (e.g., in Fahrenheit, Celsius, Kelvin, etc.), sunshine time (e.g., in seconds, hours, minutes, etc.), solar radiance (e.g., in Watts per square meter, etc.), and other data elements relating to weather data. Still other icons are available in some other embodiments.

According to some embodiments, the data matrix visualization system may receive preferences from users relating to the units displayed per data element. In one example, the data matrix visualization system may receive a preference to use megawatt-hours instead of kilowatt hours for a specific user (e.g., from a user profile or a user computer). The data matrix visualization system may convert any data type to another data type if the two data types relate to the same data element (e.g., volts to kilovolts). In another example, user preferences may include types of data. For example, the data matrix visualization system may receive an input to only include electricity information that may be displayed in megawatt hours. Accordingly, the data matrix visualization system may not display data elements except for data elements that may be received in and converted to megawatt hours (e.g., energy consumption).

In some embodiments, the icons 304 may be displayed differently. The icons 304 may be displayed as buttons, checkboxes, or other figures. In some embodiments, additional icons may be added to categorize data elements. For example, there may be two electricity icons 304 to respectively symbolize energy consumption and energy demand.

In various embodiments, the data matrix visualization system may receive an input on a location 302 to display or hide sub-locations. For example, if a user is only interested in data elements relating to the Eastern Region, the data matrix visualization system may receive an input on the Western Region and hide all of the sub-locations under the Western Region, including Store #W1 and Store #W2.

According to one embodiment, the data matrix visualization system may receive an input requesting activation of data type filter mode. In data type filter mode, the data matrix visualization system may receive an input on icons 304 such as the electricity icon 306. For example, the input may include a selection of a data element associated with the electricity icon 306. In response to the received input, the data matrix visualization system may filter the information represented by all of the electricity icons 306 to the data type of the selected data element. For example, if the data matrix visualization system receives input selecting power demand, the data matrix visualization system may filter all of the data elements in the electricity icons 306 except for data elements relating to power demand. This way, the system may display how electricity usage of sub-locations adds up to the total electricity usage of a location.

In some embodiments, if the data matrix visualization system receives an input on an icon 304, the data matrix visualization system may provide various data elements to an external entity. If the data matrix visualization system receives an input on a data element, the data matrix visualization system may display detailed information relating to the data element. The detailed information may display a graph of received data elements over a configurable window of time, units of the data elements, locations of the data elements, etc. The data matrix visualization system may receive inputs on multiple data elements from the same monitored device or different monitored devices at the same or different locations to display detailed information relating to the multiple data elements side-by-side or on the same graph.

The data matrix visualization system may further receive input on a granularity setting to modify the window of time between each displayed data element. For example, a global granularity setting may be set to display data elements measured every hour, day, week, month, etc., across all displayed data elements.

The granularity may further be altered by selecting a displayed data element to redisplay data elements with a finer granularity. In one example, a graph can display one or more data elements, each data element representing a month's energy consumption value (e.g., in Watt-hours, Joules, etc.). Responsive to selection of a data element representing a specific month's energy consumption value, the granularity is altered to display, for example, an energy consumption data element for each week in the selected month. The granularity can be further refined by, for example, selecting a specific week's energy consumption data element to display a plurality of data elements, each data element representing an energy consumption value for each day in the selected week.

Additional information may be displayed in addition to, or as an alternative to, the graph. For example, the data matrix visualization system may display the detailed information in a grid format that organizes the data elements into a table for display to a user. In further examples, the additional information may also include statistics for a selected location. For example, selection of energy consumption for a selected location may display statistics pertaining to the selected location's monthly average energy consumption, daily energy consumption maximum, weekly energy consumption minimum, etc.

In one example, the units given to data elements may change depending on the location of the data matrix visualization system. For example, the data matrix visualization system may display gas information in cubic feet to a user in America and in cubic meters to a user in Europe. In other examples, the data matrix visualization system may make the units specific to a location.

Figure 4:
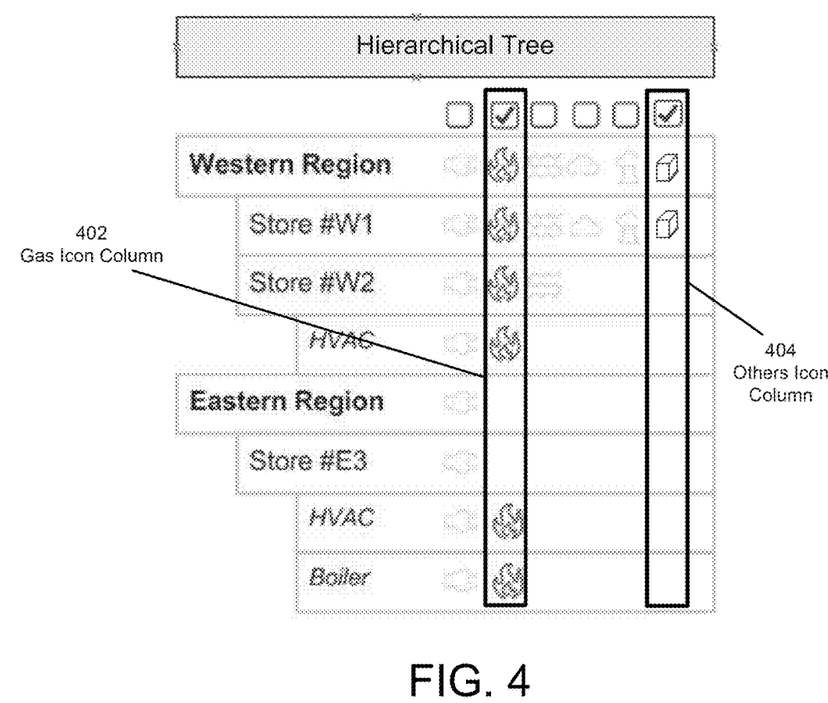
FIG. 4 is another example location and monitored device matrix, according to one embodiment.

FIG. 4 illustrates an example hierarchical diagram that may be presented when a user deselects icons. In the illustrated example, only the gas icon column 402 and the others icon column 404 are selected. According to some embodiments, locations that do not include the selected icons may be hidden. In the example illustrated in FIG. 4, Store #E4 is hidden because it did not include any gas data or other data. The Eastern Region and Store #E3 are still displayed because the HVAC and Boiler, which include gas data, are sub-locations under them.

Figure 5:
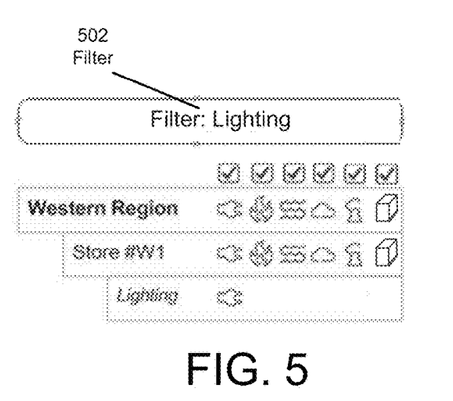
FIG. 5 is an example location and monitored device matrix with a filter, according to one embodiment.

FIG. 5 illustrates a text filter 502. The text filter may be used in addition to the selection boxes to only display information that is relevant to what a user wants to see. In FIG. 5, the data matrix visualization system receives a filter for "Lighting," so Western Region and Store #W1 are displayed because Lighting is a sub-location under them. In this example, there are no other Lighting resources to display. In some examples, if "Western Region" is entered as a filter, the Western Region alone may be displayed. However, the data matrix visualization system may receive an input on the location name Western Region to display corresponding sub-locations. The sub-location names may include a flag (e.g., underlined or italicized text) to indicate that they are not part of the filter.

Figure 6:
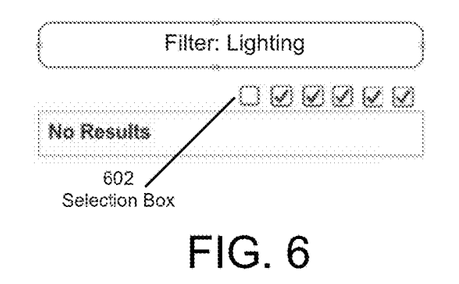
FIG. 6 is another example location and monitored device matrix with a filter, according to one embodiment.

In FIG. 6, the selection box 602 for electricity is unchecked and the filter for lighting is still received. Since the Lighting location only includes data elements relating to electricity, once electricity is unchecked, the Lighting location becomes filtered out. In this example, there are no Lighting locations to display. As a result, no results are displayed.

In the foregoing discussion, the disclosure has been directed primarily to monitoring energy usage. However, it is to be understood that the present disclosure is not limited to a passive monitoring role. Certain embodiments allow a user to not only monitor energy management parameters of a remote location, but also remotely control devices and parameters capable of being controlled.

In some embodiments, a user may alter parameters of the disclosed data matrix using the hierarchical tree of data elements. For example, the user may set a daily limit on the amount of energy usage allocated to a specific location, or the user may directly alter the power consumption of a location by remotely operating energy-consuming devices listed in the disclosed data matrix. In further examples, the user may use the disclosed monitoring system to control the heating and cooling or humidity control system of a location. It is to be understood that, in at least one embodiment, data elements that are subject to being monitored may also be controlled remotely via the disclosed energy management system.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers, and web servers. Other examples of computer systems may include mobile computing devices (e.g., smart phones, tablet computers, and personal digital assistants) and network equipment (e.g., load balancers, routers, and switches). Examples of particular models of mobile computing devices include iPhones, iPads, and iPod touches running iOS operating system available from Apple, Android devices like Samsung Galaxy Series, LG Nexus, and Motorola Droid X, Blackberry devices available from Blackberry Limited, and Windows Phone devices. Further, aspects may be located on a single computer system or may be distributed among a plurality of computer systems connected to one or more communications networks.

Figure 7:
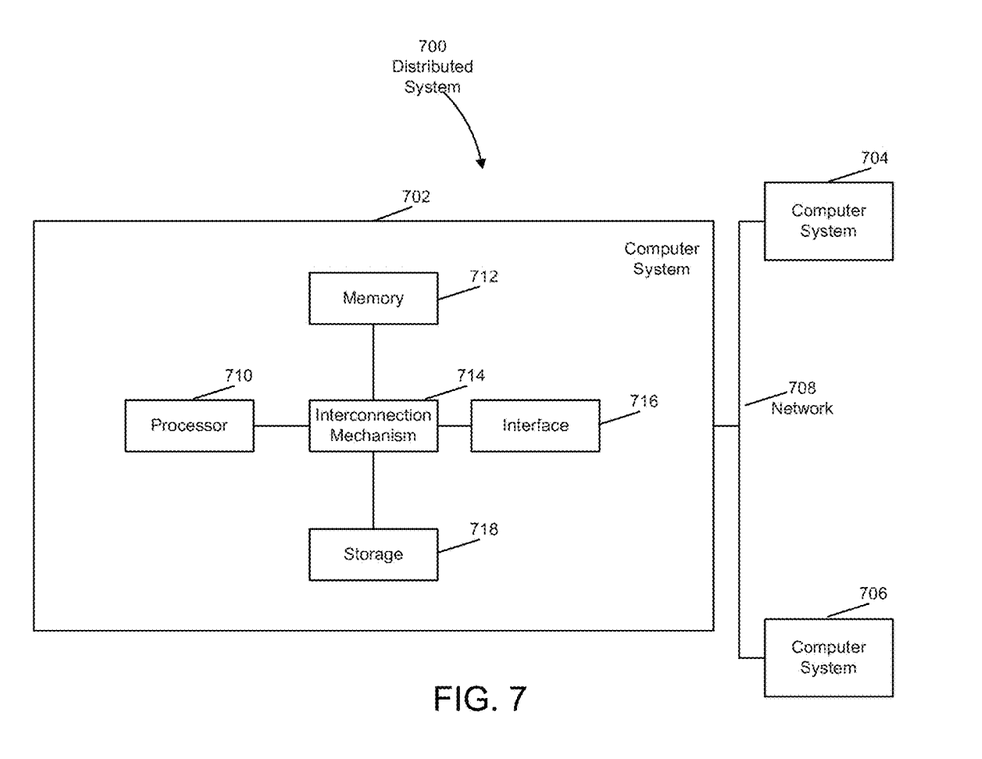
FIG. 7 shows a computer system upon which various embodiments of the present invention may be practiced.

For example, various aspects, functions, and processes may be distributed among one or more computer systems configured to provide a service to one or more client computers, or to perform an overall task as part of a distributed system, such as the distributed computer system 700 shown in FIG. 7. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Referring to FIG. 7, there is illustrated a block diagram of a distributed computer system 700, in which various aspects and functions are practiced. As shown, the distributed computer system 700 includes one or more computer systems that exchange information. More specifically, the distributed computer system 700 includes computer systems 702, 704, and 706. As shown, the computer systems 702, 704, and 706 are interconnected by, and may exchange data through, a communication network 708. The network 708 may include any communication network through which computer systems may exchange data. To exchange data using the network 708, the computer systems 702, 704, and 706 and the network 708 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 702, 704, and 706 may transmit data via the network 708 using a variety of security measures including, for example, SSL or VPN technologies. While the distributed computer system 700 illustrates three networked computer systems, the distributed computer system 700 is not so limited and may include any number of computer systems and computing devices, networked using any medium and communication protocol.

As illustrated in FIG. 7, the computer system 702 includes a processor 710, a memory 712, an interconnection element 714, an interface 716 and data storage element 718. To implement at least some of the aspects, functions, and processes disclosed herein, the processor 710 performs a series of instructions that result in manipulated data. The processor 710 may be any type of processor, multiprocessor or controller. Example processors may include a commercially available processor such as an Intel Xeon, Itanium, Core, Celeron, or Pentium processor; an AMD Opteron processor; an Apple A4 or 5 processor; a Sun UltraSPARC processor; an IBM Power5+ processor; an IBM mainframe chip; or a quantum computer. The processor 710 is connected to other system components, including one or more memory devices 712, by the interconnection element 714.

The memory 712 stores programs (e.g., sequences of instructions coded to be executable by the processor 710) and data during operation of the computer system 702. Thus, the memory 712 may be a relatively high performance, volatile, random access memory such as a dynamic random access memory ("DRAM") or static memory ("SRAM"). However, the memory 712 may include any device for storing data, such as a disk drive or other nonvolatile storage device. Various examples may organize the memory 712 into particularized and, in some cases, unique structures to perform the functions disclosed herein. These data structures may be sized and organized to store values for particular data and types of data.

Components of the computer system 702 are coupled by an interconnection element such as the interconnection element 714. The interconnection element 714 may include any communication coupling between system components such as one or more physical busses in conformance with specialized or standard computing bus technologies such as IDE, SCSI, PCI and InfiniBand. The interconnection element 714 enables communications, including instructions and data, to be exchanged between system components of the computer system 702.

The computer system 702 also includes one or more interface devices 716 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 702 to exchange information and to communicate with external entities, such as users and other systems.

The data storage element 718 includes a computer readable and writeable nonvolatile, or non-transitory, data storage medium in which instructions are stored that define a program or other object that is executed by the processor 710. The data storage element 718 also may include information that is recorded, on or in, the medium, and that is processed by the processor 710 during execution of the program. More specifically, the information may be stored in one or more data structures specifically configured to conserve storage space or increase data exchange performance. The instructions may be persistently stored as encoded signals, and the instructions may cause the processor 710 to perform any of the functions described herein. The medium may, for example, be optical disk, magnetic disk or flash memory, among others. In operation, the processor 710 or some other controller causes data to be read from the nonvolatile recording medium into another memory, such as the memory 712, that allows for faster access to the information by the processor 710 than does the storage medium included in the data storage element 718. The memory may be located in the data storage element 718 or in the memory 712, however, the processor 710 manipulates the data within the memory, and then copies the data to the storage medium associated with the data storage element 718 after processing is completed. A variety of components may manage data movement between the storage medium and other memory elements and examples are not limited to particular data management components. Further, examples are not limited to a particular memory system or data storage system.

Although the computer system 702 is shown by way of example as one type of computer system upon which various aspects and functions may be practiced, aspects and functions are not limited to being implemented on the computer system 702 as shown in FIG. 4. Various aspects and functions may be practiced on one or more computers having a different architectures or components than that shown in FIG. 4. For instance, the computer system 702 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 702 may be a computer system including an operating system that manages at least a portion of the hardware elements included in the computer system 702. In some examples, a processor or controller, such as the processor 710, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 710 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Based on the foregoing disclosure, it should be apparent to one of ordinary skill in the art that the invention is not limited to a particular computer system platform, processor, operating system, network, or communication protocol. Also, it should be apparent that the present invention is not limited to a specific architecture or programming language.

Having now described some illustrative aspects of the invention, it should be apparent to those skilled in the art that the foregoing is merely illustrative and not limiting, having been presented by way of example only. While the bulk of this disclosure is focused on embodiments directed to business management, aspects of the present invention may be applied to other information domains, for instance law and scientific disciplines. Similarly, aspects of the present invention may be used to achieve other objectives including assisting other types of users, such as domain information experts, in their analysis of specific information domains. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

What is claimed is:

1. An energy management system for remotely managing energy usage, comprising:
    a plurality of monitored devices disposed at a plurality of locations, each of the monitored devices including a processor and configured to monitor, control, provide, or consume one or more energy resources at a respective location of the plurality of locations; and
    a computer-based system in communication with the monitored devices, the computer-based system including:
    a memory device; and
    at least one hardware processor coupled to the memory device and configured to:
        receive data indicative of the one or more energy resources monitored, controlled, provided, or consumed by the monitored devices from the monitored devices;
        categorize the received data by energy resource and location to produce a categorized set of data elements;
        provide the categorized set of data elements to a user interface of the computer-based system, the categorized set of data elements being displayed in a hierarchical matrix including a tree of locations illustrating relationships between the monitored devices, wherein the hierarchical matrix has at least a first dimension and a second dimension, the first dimension representing the one or more energy resources, and the second dimension representing the plurality of locations;
        analyze the hierarchical matrix and determine that the energy usage of a specific location of the plurality of locations exceeds an allocated daily energy usage of the specific location;
        alter select parameters of the hierarchical matrix using the categorized set of data elements in response to determining the energy usage of the specific location exceeds the allocated daily energy usage of the specific location; and
        remotely operate select ones of the monitored devices based on the altered parameters to alter the energy usage of the specific location.

2. The system of claim 1, wherein at least one of the one or more energy resources includes electricity, water, gas, or steam.

3. The system of claim 1, wherein the computer-based system is further configured to generate and display a graph of a selected set of data elements from the categorized set of data elements.

4. The system of claim 3, wherein the selected set of data elements includes data elements derived from two or more different locations.

5. The system of claim 3, wherein the selected set of data elements includes two or more different types of data elements.

6. The system of claim 1, wherein at least one of the monitored devices includes at least one of: a heater, an air conditioner, and a meter.

7. The system of claim 1, wherein the energy management system is coupled to supervisory control and data acquisition (SCADA) systems, building management systems (BMS), building automation systems (BAS), heating, ventilating, and air conditioning (HVAC) systems, and other systems that record information.

8. A method for remotely managing energy usage, comprising:
    receiving, at an input of a processor of a computer-based system in communication with a plurality of monitored devices, data indicative of energy resources monitored, controlled, provided, or consumed by the monitored devices, wherein the monitored devices include a processor and are configured to monitor, control, provide, or consume the energy resources at a respective location of a plurality of locations;
    categorizing the received data by energy resource and location to produce a categorized set of data elements;
    providing the categorized set of data elements to a user interface of the computer-based system, the categorized set of data elements being displayed in a hierarchical matrix including a tree of locations illustrating relationships between the monitored devices, wherein the hierarchical matrix has at least a first dimension and a second dimension, the first dimension representing the energy resources, and the second dimension representing the plurality of locations;
    analyzing the hierarchical matrix and determining that the energy usage of a specific location of the plurality of locations exceeds an allocated daily energy usage of the specific location;
    altering select parameters of the hierarchical matrix using the categorized set of data elements in response to determining the energy usage of the specific location exceeds the allocated daily energy usage of the specific location; and
    remotely operating select ones of the monitored devices based on the altered parameters to alter the energy usage of the specific location.

9. The method of claim 8, wherein at least one of the energy resources includes electricity, water, gas, or steam.

10. The method of claim 8, further comprising generating and displaying a graph of a selected set of data elements from the categorized set of data elements.

11. The method of claim 10, wherein the selected set of data elements includes data elements derived from two or more different locations.

12. The method of claim 10, wherein the selected set of data elements includes two or more different types of data elements.

13. The method of claim 8, wherein at least one of energy resources is electricity, and the data indicative of the energy resources includes at least one of: energy consumption, energy demand, active power consumption, active power demand, apparent energy consumption, apparent energy demand, reactive energy consumption, reactive power consumption, reactive power demand, power factors, and other data elements related to electricity.

14. The method of claim 8, wherein categorizing the received data by energy resource and location to produce a categorized set of data elements, includes:
    converting the received data from one data type to another data type based on user preferences.

15. The method of claim 14, wherein the received data includes electrical data, and converting the received data from one data type to another data type based on user preferences, includes:
    converting select portions the electrical data from first measurement units to second, related measurement units based on user preferences.

16. The method of claim 15, wherein the first measurement units include volts and the second measurement units include kilovolts.

17. The method of claim 8, wherein providing the categorized set of data elements to a user interface of the computer-based system, includes:
   providing the categorized set of data elements to the user interface of the computer-based system for displaying only portions of the categorized set of data elements based on user preferences.

18. The method of claim 17, wherein the user preferences include displaying only data elements related to energy consumption.

19. The method of claim 8, wherein receiving data indicative of the energy resources monitored, controlled, provided, or consumed by the monitored devices from the monitored devices, includes:
   sending, from each of the monitored devices, an indication of the type of data being sent to the computer-based system from the monitored devices.

* * * * *